Aug. 15, 1961  AN WANG  2,996,249
ELECTRONIC COMPARATORS
Filed Oct. 24, 1957  3 Sheets-Sheet 1

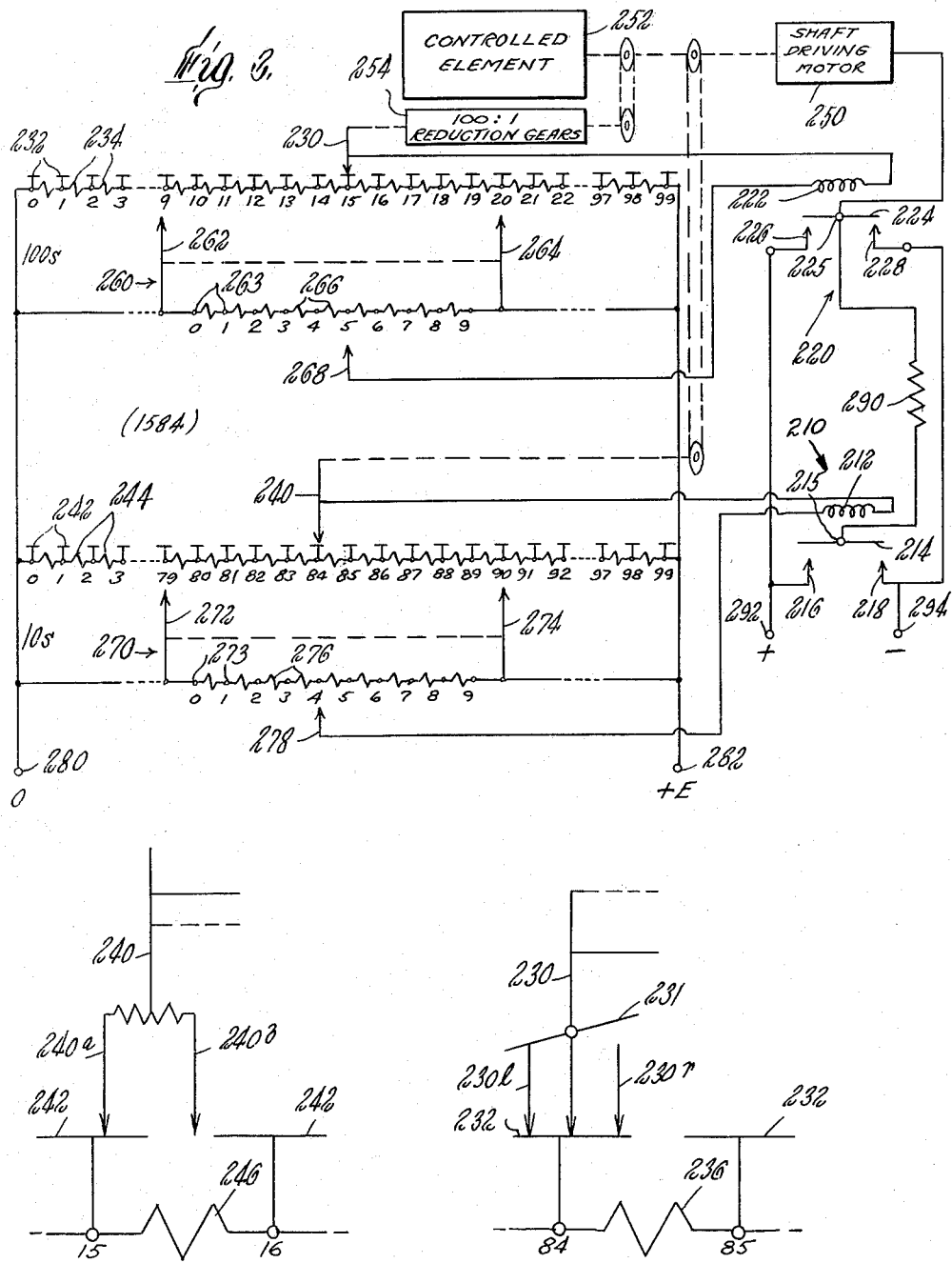

United States Patent Office 2,996,249
Patented Aug. 15, 1961

2,996,249
ELECTRONIC COMPARATORS
An Wang, Lincoln, Mass., assignor to Wang Laboratories, Inc., Natick, Mass., a corporation of Massachusetts
Filed Oct. 24, 1957, Ser. No. 692,140
13 Claims. (Cl. 235—177)

This invention relates to electronic control devices and more particularly to a device including a digital comparator for comparing quantities, such as digital numbers having two or more significant figures, usually for equalization of such numbers so that, for instance, an unknown pulse series may be controlled to a value equal to that of one or more predetermined numbers or a stored series of pulses may be valued either by, in effect, counting or by solving an equation wherein they are an input variable.

It is frequently desirable especially in digital control systems, to compare two digital numbers having a plurality of significant figures and control one of them to provide an error signal for equalization or the like. Heretofore, however, for digital accuracy, this apparently simple operation has required that at least one number be counted by conventional digital techniques, and in the case of numbers having many significant figures, this was an operation that required a substantial amount of circuitry.

It is a major object of the present invention to provide a novel digital comparator which does not require counting as with digital techniques and yet which has the accuracy inherent in digital techniques as opposed to analogue techniques.

According to the invention, comparison of digital numbers having any number of significant figures is accomplished, not by counting the entire number, but by evaluating each significant figure of the number in turn beginning with the highest decade of the number. Thus, if a number having three significant figures, for example, "734," is to be compared, as might be required in order to position a controlled element, say, of a machine tool in accordance with either a manual or automatic presetting of such number, according to the present invention the three significant figures are sequentially compared in terms of representative voltages, beginning with the highest decade, "7," thence preceeding to the next highest decade, the "3," and finally completing the comparison with the lowest decade, "4." This sequential action is accomplished by providing a series of relay means, one relay means for each of the significant figures to be compared. Such relay means are interconnected so that the error signal output of such a series as applied, say, for positioning an element and for simultaneously providing a voltage representing a number to be compared with the preset voltage representing the number "734" until equalization occurs, or at least is passed, is first controlled by the highest preset decade "7," until the number to be compared is equal thereto. Thereafter, the highest numbers being equal, the comparison relay associated therewith loses its controlling function, which shifts to the next highest significant figure of the number. Such shifts continue until the last significant figure of the number to be compared has been balanced with the preset number, whereupon positioning of the controlled element, for example, is completed.

In essence, then, the invention provides a series of relay means, the control function of which is progressively shifted or otherwise made effective from the highest to the lowest decade controlling one of the series though not necessarily by deactivating such relay means as by disconnecting them. Each of such relay means has control means to which are applied two voltages representing the preset digital significant figure to be compared and the corresponding significant figure to be compared therewith. Suitable current carrying means responsive to said control means are also provided for each of said relays, said control means providing an output error signal usually effective both to operate a controlled element and to supply the number to be compared in accordance with said control means, generally in terms of a positive or negative voltage or a direction of current flow. The progressive effectiveness or shift of the series of relay means can be produced by the use, for example, of resistance means providing increasing resistance along the series in the direction of the relay means thereof for comparing the lowest significant figure, so that the output taken from the highest decade relay control means controls the system until it becomes ineffective by reason of voltage equalization across its control means, thus shifting control to the next highest, less effective relay means.

Depending upon the ultimate use of the digital comparator of the invention, the relay means forming the series may be of several types. Thus, if high speed is essential, electronic gain producing means, such as conventional vacuum tubes, transistors and the like, may be employed. On the other hand, if high speed is not a necessary requirement, electric relays, preferably of the polarized type, having a control winding effective to operate suitable contacts, may be used, such relays generally being more reliable than are electronic devices.

It is a particular feature of the invention, whatever be the relay means employed therein, that the circuitry is simple and direct, without reliability reducing complications, and enables the comparison of digital numbers, in the form of voltages representing same, having any number of significant figures, although numbers having relatively few significant figures are used as illustrations herein for reasons of simplicity.

Since the operation of the digital comparator of the invention is dependent upon the application to its control means of voltages representing corresponding significant figures of the numbers to be compared, it is a further object of the invention to provide means for converting an input representing a number having a plurality of significant figures to a series of voltages each representative of one of said significant figures. Again, such means may take various forms depending upon the manner in which the numbers to be compared are presented or stored, i.e., pulses, positions of mechanical elements, etc.

Various other objects and features of the invention will be apparent from the following description of preferred embodiments thereof, together with the accompanying drawings, wherein:

FIG. 3 is a circuit diagram showing, in simplified form, a partially diagrammatic view of a third modification of the invention, and FIGS. 4 and 5 are detail views of minor modifications of portions of the circuit of FIG. 3.

Figure 1:
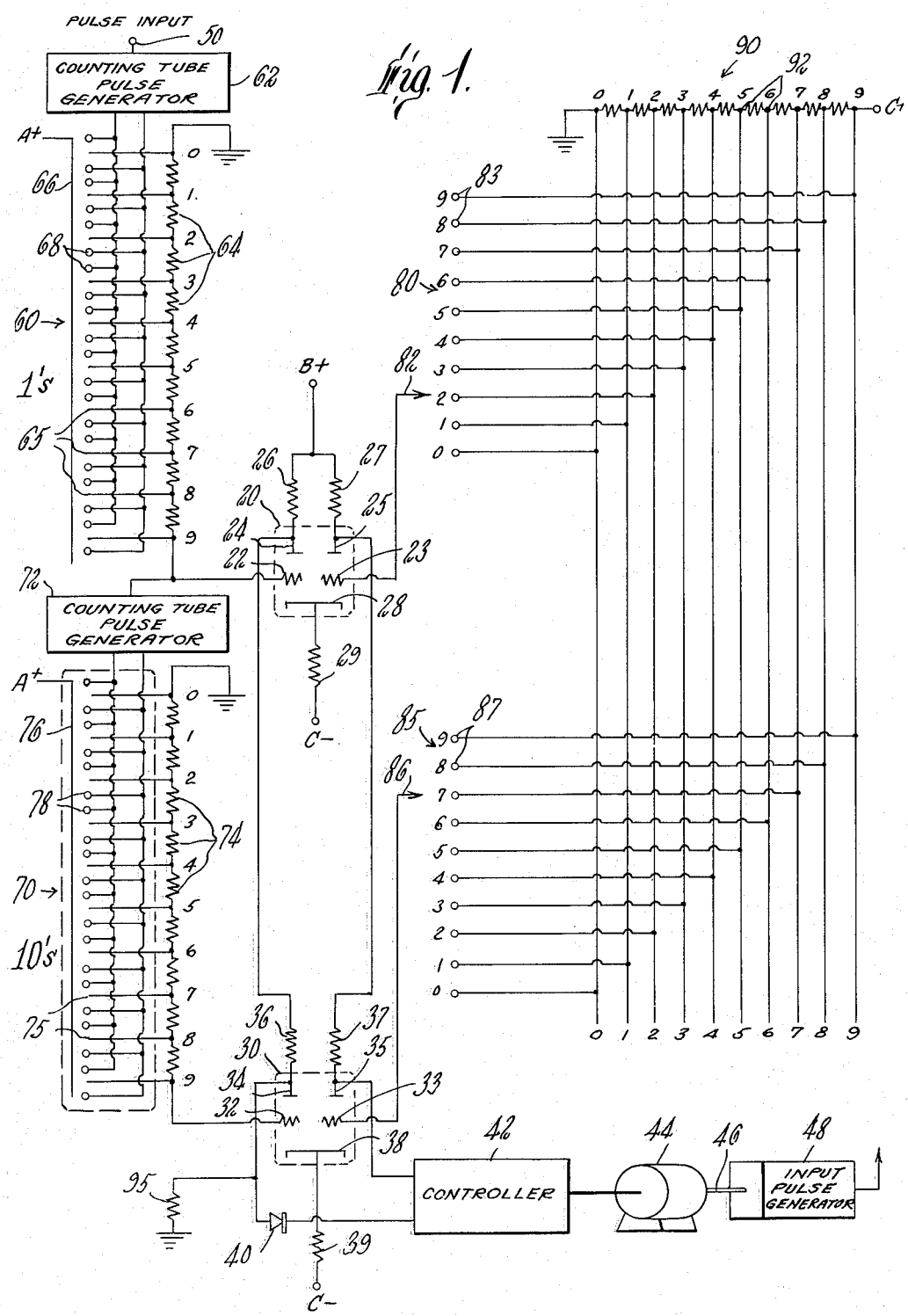
FIG. 1 is a circuit diagram showing, in simplified form, a partially diagrammatic view of a first modification of the invention.

Referring to FIG. 1, the embodiment of the comparator therein shown includes at least two pairs of gain producing means such as pairs of triodes or twin triodes 20 and 30. Each of said twin triodes has a pair of control elements or grids 22, 23 and 32, 33, respectively, output current carrying elements or plates 24, 25 and 34, 35, respectively, with resistance elements 26, 27 and 36, 37 in series therewith as well as common cathode elements 28 and 38 having in series therewith resistance elements 29 and 39 of relatively high value connected to a suitable bias source at their terminals C— to provide operation of the cathode follower type. The plate resistance elements of one of the two triodes of each of the pairs of triodes are interconnected in series relation with one another, that is, resistance elements 26 and 36 are in series and resistance elements 27 and 37 are in series to provide two parallel series of resistance elements each having successively higher values of resistance in series connection between the voltage source at B+ connected to resistance elements 26 and 27 and the plates 24, 25 and 34, 35. Preferably, the value of resistance between plates 34, 35 and B+ is twice that between plates 24, 25 and B+ so that the plates of succeeding triodes 20, 30 operate at one-half the voltage of that at the plates of preceding triodes of the series, which causes the triodes having the higher plate resistance to effectively control until balanced. A series of such pairs of triodes interconnected by pairs of resistance means increasing in value along the series may be made to operate as a digital voltage comparator capable of comparing digital voltages applied to their control elements, and the significant figures of the number to be compared may be as many as there are pairs of triodes, the pairs, in effect, shifting their controlling function along the series as the sequentially higher digital figure of the number becomes equalized. This action is accomplished by applying voltages to be compared to the control elements and by detecting the resultant difference between the current flow in each of the two series of resistance elements, as by means of diode 40 and controller 42 connected between plates 34 and 35 of the last twin triode 30 of the series. This difference may be utilized, for example, to control the relative values of voltage applied to the grids 24, 25 and 34, 35 of the triodes, to equalize them, for example, so that an unknown digital number may be compared with a known one.

Thus, as shown in FIG. 1, a pulse input at terminal 50 may be converted into a digital series of voltages with a voltage representing each of its significant figures by means of a series of cold cathode discharge counting tubes generally designated 60 and 70 having suitable operating pulse generators 62 and 72, respectively, and nine resistor elements 64 and 74, respectively, connected in series between each of their ten cathodes 65 and 75, respectively, numbered at 0–9 in FIG. 1 and hereinafter referred to as, for example, 65-2 and 75-7. Such counting tubes are well known in the art, and accordingly will not be described in detail herein, except to point out that a glow discharge extending between the common anode 66, 76 and a cathode 65, 75 of such a tube is advanced from cathode to cathode around the tube by the application to its pairs of guide electrodes 68 or 78 of a pair of successive pulses supplied by the application of each pulse to be counted by such tube to its pulse generator 62 or 72. Thus with two of such tubes 60 and 70 in series, the first of such tubes will be responsive to the "1's" and the second of such tubes will be responsive to the "10's," since the pulse generator 72 of the second tube 70 is actuated by the transfer of the glow discharge once around the tube (although here shown for clarity as in a line). Further of such tubes in series would, of course, be responsive to "100's," "1,000's," etc.

The count stored in such a tube as a glow discharge between its anode and one of its cathodes can be converted to a D.C. voltage by connecting its cathodes 65 or 75—0 through 9 in series to ground through identical resistor elements 64 or 74 so that a voltage proportional to the count in the counting tube 60 or 70 can be applied to the one series of grids 22 and 32 respectively, of twin triode 20 or 30 by connecting each said grid to a series of said resistor elements at its ends opposite from ground, that is, at the 65 or 75—9 cathode of a counting tube 60 or 70. Thus the count in the "1's" tube 70 is converted to a D.C. voltage which is applied to grid 22 of triode 20 and, similarly, the count in the "10's" tube 70 is converted to a D.C. voltage which is applied to grid 32 of triode 30.

In order to apply predetermined voltages to the other series of grids 23 and 33 of triodes 20 and 30, switches 80 and 85 are provided, switch 80 having its movable contact 82 connected to grid 23 of triode 20 and switch 85 having its movable contact 86 connected to grid 33 of triode 30. Each of said switches has ten terminals 83 and 87, respectively, numbered "0" through "9," connected in sequence to a resistor 90 having ten taps 92—0 through 9, providing voltages at said terminals 83, 87 equal to the voltages provided at cathodes 65 and 75—0 through 9 of counting tubes 60 and 70.

Assume that the above described comparator is arranged to operate a feed screw motor 44 of a machine tool through a suitable controller 42, and that the motor is to be rotated to advance the feed screw a predetermined distance as represented, say, by seventy-two revolutions of motor shaft 46. With such an arrangement, an input pulse generator 48 may be connected to shaft 46 to provide an input pulse for each revolution of said shaft, which pulse is applied to terminal 50. If switches 80 and 85 be actuated to connect their movable contacts 82 and 86 to their terminals 83—2 and 87—7, voltages equivalent to those at terminals 92—2 and 92—7 of resistor 90 will be applied respectively to grids 23 and 33 of triodes 20 and 30. Since the glow discharges in counting tubes 60 and 70 are initially in "0" position, there will be "0" voltage applied to triode grids 22 and 32. The dissimilar voltage on the grids of the pairs of triodes, i.e., "0" and "2" voltage on grids 22 and 23, respectively, and "0" and "7" voltage on grids 32 and 33, respectively, cause current to flow through controller 42 and so operate motor 44 to rotate shaft 46. The pulses produced by input pulse generator 48 resulting from the rotation of shaft 46 are applied to the series of counting tubes 60 and 70 at terminal 50 and first cause the voltage on grid 22 of triode 20 to increase successively to "9," but since triode 30 effectively controls the current flow through resistors 36 and 26, the circuit remains in unbalance. However, when the count of "70" is reached, grids 32 and 33 of triode 30 are at equal voltage and such triode no longer affects circuit unbalance. Triode 20 then becomes effective to control the circuit unbalance and controller 42 continues to operate motor 44 until the count of "72" is reached. Circuit balance is then complete, since grids 22 and 23 of triode 20 are then also at equal voltages and controller 42 stops motor 44 to cut off the error signal input pulses applied at terminal 50 by generator 48.

To describe more specifically the operation of each of the pairs of triodes and of the sequence thereof, as an example consider each of said triode pairs to be a 12AX7, with a B+ voltage of 300 volts and a C— voltage of 300 volts negative. Each of the common cathode resistors has a value of 300,000 ohms and each of the plate load resistors 26, 27 and 36, 37 a value of 5,000 ohms. It will be noted that with such plate load resistor values, the total value of plate load resistance at plates 34 and 35 is 10,000 ohms, twice the value at plates 24 and 25. Were another twin triode present in the series, it would need plate load resistors of 10,000 ohms. With the above circuit values, and with voltages of 0 volts and 2 volts applied to grids 22 and 23 respectively, plate current of a value of about 1 milliampere will flow from plate 25 to cathode 28 as controlled in part by the combined value of resistors 27 and 29 and in part by the grid voltage, the tube in effect reaching a condition of balance because of the high value of cathode resistor 29 which causes its cathode voltage to follow its grid voltage in the manner of a cathode follower. This can be seen from the characteristic plotted curves of plate milliamperes vs. plate volts for a 12AX7 single triode unit, and under these conditions the cathode will assume a voltage of about 2.6 volts positive with respect to the voltage of 2.0 volts applied to grid 23, so that the total voltage on cathode 28 is about 4.6 volts with respect to the voltage of 0 volts applied to the other grid 22 of the pair. Since a grid voltage of −4.6 at a plate voltage of 300 results in effectively a zero current flow in a 12AX7 triode unit, as appears from said curves, the side of said twin triode having the higher grid voltage, in this example, the right hand side of FIG. 1, carries essentially the entire current flow of 1 milliampere and causes a voltage drop of 5 volts across resistor 27, so that a voltage unbalance of 5 volts exists between plate 24 and plate 25.

Twin triode 30 operates in exactly the same manner as a bistable device to provide its entire 1 milliampere current flow through the plate load resistor of the triode side with the higher grid voltage, in this example, the right hand side to which 7 volts is applied to grid 33 as compared to 0 volts applied to grid 32, except that the voltage drop across its entire plate load resistance made up of resistors 27 and 37 due to its plate current is 10 volts. Accordingly, so long as the opposed grids of any triode pair are at different voltage values whereby plate current flow through one side thereof is effectively cut off, the last triode pair of the series will maintain a voltage difference between its two plates, herein plates 30 and 35, which will operate the controller 42 irrespective of the voltage differences between plates of preceding triodes, since under the worst conditions, with a preceding triode conducting in the opposite direction, the voltage drop of the last triode pair will be greater than the sum of the voltage drop of preceding triode pairs, each being but one half that of a succeeding triode pair. However, as the last and progressively preceding pairs of triodes become balanced by the application of identical grid voltages, each side thereof will conduct so that there will be no difference in their plate voltages caused by one side being cut off, and hence each preceding triode will take over the operation of controller 42 upon balance of its next succeeding triode.

If desired, and in order to compensate for the variances in conventional electronic components, such as tubes and resistors, a bleeder resistor 95 may be connected between the plate 34 of triode 30 and ground, the value of such resistor being adjusted to cause a slight condition of unbalance at all times.

It will be appreciated that switches 80 and 85, shown as manually operated to preset the number to be compared, may be operated by automatic means, such as by magnetic or punched tape to provide inputs and that suitable means, not shown, may be provided for restoring the circuitry to its zero condition as by reversing motor 44 for a suitable number of turns, the circuit of FIG. 1 being shown in a simplified form in the interest of clarity.

Figure 2:
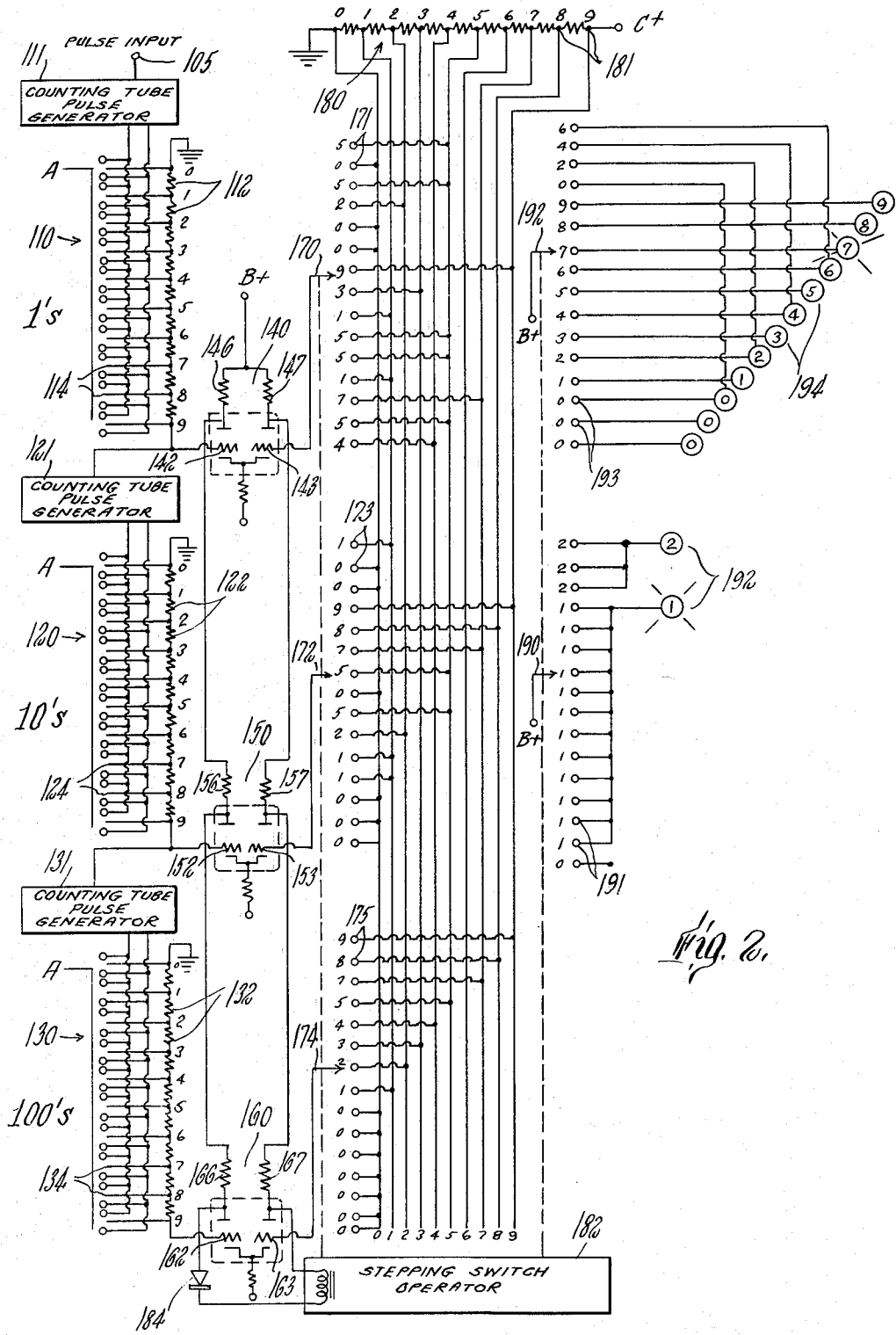
FIG. 2 is a circuit diagram showing, in simplified form, a partially diagrammatic view of a second modification of the invention.

In FIG. 2 is shown an embodiment of the comparator of the present invention of the type of that of FIG. 1 but used as a special purpose computer wherein, for example, an equation in tabular form involving a variable represented by a pulse input of as many as three significant figures is automatically solved and presented as a display of a number having two significant figures, a typical table as a specific example being represented by the following:

| Input pulses (variable): | Display numbers (solution) |
|---|---|
| 0–4 | 0 |
| 5–6 | 10 |
| 7–10 | 11 |
| 11–14 | 12 |
| 15–24 | 13 |
| 25–50 | 14 |
| 51–102 | 15 |
| 103–258 | 16 |
| 259–369 | 17 |
| 370–479 | 18 |
| 480–591 | 19 |
| 592–704 | 20 |
| 705–799 | 22 |
| 800–914 | 24 |
| 915 or more | 26 |

In this embodiment, the pulse input, that is, the variable of the equation to be solved, is provided at terminal 105 by any suitable pulse generator actuated by a means establishing the variable and is stored in three decade glow tube counters 110, 120, and 130 by their associated pulse generators 111, 121, 131 representing, respectively, "1's," "10's" and "100's." As set forth in the description of the embodiment of FIG. 1, each of the glow tube counters has a plurality of resistors 112, 122, and 132 in series across its cathodes 114, 124 and 134 providing a voltage proportional to the count stored in the particular counter tube. Such resistors are connected to the grids 142, 152 and 162 of one of each of the pairs of triodes 140, 150 and 160 so that the voltage produced by each of counter tubes 110, 120 and 130 is applied to the appropriate grid of a comparator triode.

The comparison voltage is applied to the other series of grids 143, 153 and 163 in accordance with the above table by means of a stepping switch having three movable contacts 170, 172 and 174 connected, respectively, to triode grids 143, 153 and 163, said movable contacts each having groups of terminals 171, 173 and 175 respectively. In order to provide the proper comparison voltages, said groups of terminals are each fifteen in number and are provided with appropriate voltages by means of a resistor 180, said resistor having a plurality of taps 181 numbered "0" through "9" with voltages thereat corresponding to the voltages at the cathodes 114, 124 and 134 numbered "0" through "9" of each of the counting tubes 110, 120 and 130. The individual terminals associated with each of movable switch contacts 170, 172 and 174 are suitably connected to one of taps 181—0 through 9 of resistor 180, each of said terminals 171, 173 and 174 being marked in the drawing with the same number as that of the top of resistor 180 to which it is connected to make clear the voltage condition at each of said terminals.

The three twin triodes 140, 150 and 160 are, like the triodes 20 and 30 of FIG. 1, arranged with the plate resistance elements 146, 156 and 166 of one of the two triodes of each of three pairs in series with one another, and with the plate resistance elements 147, 157 and 167 of the other of the two triodes of each of the three pairs in series with one another. As before, then, successively higher values of resistance in series connection is provided on each side of the pairs of triodes, with the value of resistance between plates 166 and 167 and B+ preferably twice that of the value of resistance between plates 156 and 157 and B+, which, in turn, is twice that of the value of resistance between plates 146 and 147 and B+. Thus, although resistance elements 146, 147, 156 and 157 are of equal value, resistance elements 166 and 167 are twice that value.

The difference in current flow in the two series of resistor elements 146, 156 and 166 and 147, 157 and 167 is utilized to operate the stepping switch operator 182 through diode 184 to advance its movable elements 170, 172 and 174 from the lowest toward the highest terminals of groups 171, 173 and 175, as shown in the drawing, by successively shifting control until the voltage on each of the opposite grids of a twin triode is at least equalized and generally somewhat exceeded, the operator 182 being connected on one side to plate resistor element 167 and on the other side to plate resistor element 166 through diode 184 to prevent reverse movement or hunting of the stepping switch.

In order to display the solution to the equation in accordance with the count stored in counter tubes 110, 120 and 130, two additional movable contacts 190 and 192 are provided in the stepping switch, each having groups of terminals 191 and 193 of sixteen in number and being movable by operator 182 in synchronism with movable contacts 170, 172 and 174. The groups of terminals 191 and 193 are each connected to the appropriate one of a series of indicator lights 192 and 194, respectively, to display the number corresponding to the solution to the equation in the table as set forth above. Thus, series of lights 192 indicating the tens numbers "1" or "2" are connected to the appropriate terminals 191 and series of lights 194 indicating the units numbers "0" through "9" are connected to the appropriate terminals 193.

To illustrate the operation of the device of FIG. 2, assume that a count of "300" pulses has been stored in the counter and the stepping switch movable contacts 170, 172, 174, 190 and 194 have been set in their lowest position by any suitable means known in the stepping switch art. Under these conditions, the difference current flow through stepping switch operator 182 will cause it to advance said movable contacts until they reach their terminals corresponding to a "9" in terminals 171, a "5" in terminals 173, and a "2" in terminals 175, corresponding to the number of "259" of the table. Since the triodes are still not balanced at this position, stepping switch operator 182 will step the movable contacts along one more step. Even though after this occurs the difference current tends to be in the opposite direction, diode 184 prevents its flow so that the movable contacts then stop advancing, the contacts 170, 172 and 174 then being positioned as shown on the respective terminals 171, 173 and 174 at "0," "7" and "3" corresponding to "370" the next highest sequence of input pulses.

The contacts 190 and 194, being in effect one step behind because their terminals 191 and 193 are sixteen in number, also stop so that tens indicator light "1" of series 192, associated with contact 190, and units indicator light "7" of series 193, associated with contact 192, together display the number "17," the solution to the equation, indicating that the variable was a number less than "370" but equal to or more than "259."

The cycle of operation, that is the storing of pulses presented to terminal 105 providing the input variable, and the operation of the stepping switch operator 182 to solve and display the solution, may be periodically carried out by resetting the counting tubes 110, 120 and 130 as well as stepping switch operator 182 to zero by means well known to the art and hence not herein described.

The embodiments of the gain producing type of digital comparator of the present invention as described in relation to FIGS. 1 and 2 are both capable of high speed operation and feature an input wherein a series of pulses are converted into representative voltages for application to one of the control elements of each pair of triodes for comparison with a set voltage. Under some conditions, however, a pulse input may not be necessary and other arrangements hereinafter described may be used wherein a representative series of voltages is present for operation of the series of comparators. Under such circumstances, reversible operation by the elimination of diodes in the output circuit is contemplated, so that the output current flows in two directions to operate a controller in at least two senses.

A somewhat different form of the comparator of the invention embodying electric relay means and a different type of input circuit is shown in FIG. 3, wherein a series of double pole polarized relays with a common terminal as known to the art are used as relay means rather than electron tubes or their equivalents, such relays having their elements maintained out of contact with both their opposite connecting terminals under conditions of zero current flow through their windings, and being connected to one or the other of said terminals, depending upon the direction of current flow through their windings.

As shown, a series of two polarized relays is used, a relay generally designated 210 having a control winding 212 with a current carrying element 214 having a common terminal 215 and two selectable terminals 216 and 218 being used to control the "10's" portion of the apparatus, and a relay generally designated 220 similarly having a control winding 222 and element 224 with common terminal 225 and selectable terminals 226 and 228 being used to control the "100's" portion of the apparatus so that a number having four significant figures can be controlled. As the controlling element, a pair of continuously rotary contactors 230 and 240 may be used, each cooperating with a plurality of fixed terminals 232 and 242 respectively with resistance elements 234 and 244 therebetween all equally spaced thereabout with said terminals herein shown as one hundred in number and being numbered "0" through "99" on the drawing with rotary contactor 230 being shown in contact with fixed terminal 232—15 and rotary contactor 240 being shown in contact with terminal 242—84. The rotary contactors 230 and 240 have suitable shafts driven by a common shaft driving motor 250 which also serves to drive the controlled element 252, such as a lath feed screw, for instance, in synchronism with rotary contactors 230 and 240, and contactor 230 is further driven at one hundredth of the speed of rotary contactor 240 by means of suitable 100:1 reduction gears 254.

To provide for setting of a known number of four significant figures into the series of fixed terminals whereby to operate the shaft driving motor 250 by means of relays 210 and 220 to move rotary contactors 230 and 240 to such number and so position controlled element 252, an adjustable switch element is provided for each of said series of terminals 232. Thus, the switch element generally designated 260 comprises two contacts 262 and 264 spaced apart a distance equal to the distance between ten terminals 234 and together movable—such contacts herein being shown as in contact with terminals 232—9 and 232—20—such contacts 262 and 264 having spaced therebetween ten terminals 263 numbered "0" through "9" and having therebetween resistors 266. An auxiliary contact 268 is provided movable along terminals 263, herein being shown contacting terminal 263—5.

Similarly, a switch element generally designated 270 is provided for the series of terminals 242 and comprises two contacts 272 and 274 spaced apart a distance including ten terminals 242 and together movable, herein shown in contact with terminals 242—79 and 242—90, such contacts having therebetween ten terminals 273 and resistors 276 of a value equal to that of resistors 244. An auxiliary contact 278 is again provided, herein shown as in contact with terminal 273—4.

A first source of D.C. voltage, preferably zero voltage, is applied at terminal 280 to terminals 232—0, 242—0, 263—0, 273—0, and to contacts 262 and 272, while a second source of D.C. voltage, E, say, 20 volts, is applied at terminal 282 to terminals 232—99, 242—99, 263—9, 273—9, and to contacts 264 and 274. Of the tens series, contacts 240 and 278 are connected to opposite ends of bistable relay control winding 212 and similarly, of the hundred series, contacts 230 and 268 are connected to opposite ends of relay coil 222. The common terminals 215 and 225 of relay elements 214 and 224 are connected together through a resistor 290, while the common terminal 225 of the highest digital series is connected to shaft driving motor 250, such arrangement being effective to "weight" the series of bistable relays so that the highest digital number effectively controls the shaft driving motor 250 until it becomes balanced and then the effective control shifts to the next highest, and so on. Current for driving the reversible shaft driving motor 250 is supplied at terminals 292 and 294, a positive voltage for driving motor 250 in one direction being applied to terminal 292 connected to relay terminals 216 and 226, and a negative voltage for driving motor 250 in the opposite direction being applied to terminal 294 connected to relay terminals 214 and 224.

In operation, assuming that the controlled element 252 is to be positioned in accordance with the four significant digit number "1584," the tens switch element 270 is set as shown with contact 272 on terminal 242—79 and contact 274 on terminal 242—90 and contact 278 on terminal 273—4, to represent the tens digits "84" and the hundreds switch element 260 is set as shown with contact 262 on terminal 232—9 and contact 264 on terminal 232—20, and contact 268 on terminal 263—5, to represent the hundreds digits "15." In each series this will result in a voltage of, say zero volts being applied at the left-hand side of the drawing up to terminals 232—9 and 242—79 and a voltage of say 20 volts being applied at the right-hand side of the drawing from terminals 232—20 and 242—90, with a stepped voltage therebetween, of a value of, say 10 volts at contact 268 and of, say, 8 volts at contact 278. If the rotary contactors 230 and 240 are positioned as shown, there will also be a value of, say, 10 volts at contact 230 and of 8 volts at contact 240, so that no current will flow through relay coils 212 and 222 and their elements will remain balanced as shown and so prevent the application of any voltage to shaft driving motor 250 so that it will remain in position.

Suppose, however, that switch elements 260 and 270 being set as described above, contactor 230 is on terminal 232—3 and contactor 240 is on terminal 242—97. Under these circumstances, a zero voltage appears on contactor 230 carrying current to flow from contact 268 (10 volts) through relay coil 222, and so pulling in switch element 224 against its terminal 226. This connects motor 250 through terminals 225 and 226 to a source of positive voltage, thereby tending to rotate contactor 230 to move it to the right, as shown in FIG. 3. At the same time, a 20 voltage appears on contactor 240, causing current to flow from contact 278 (8 volts) through relay coil 212 and so pulling in switch element 214 against its terminal 218. This connects motor through its terminals 215 and 218 to a source of negative voltage, thereby tending to rotate contactor 240 to move it to the left as shown in FIG. 3. However, due to the presence of resistor 290, the current applied by coil 222 provides the greater current flow in motor 250 so that it rotates in a direction to move the contactors 230 and 240 to the right as shown in FIG. 3, as well as moving controlled element 252 in the proper direction, until contactor 230 reaches terminal 232—15, and relay element 224 opens. Relay 210 is then able to control, and it moves the contactors in whatever direction is called for by the then position of contactors 240. Thus, if contactor 240 then be on terminal 242—87, for example, relay element 214 will be against its contact 218, thus connecting motor 250 to a source of negative voltage at terminal 294 and causing motor 250 to rotate contactor 240 to move it to the left as shown in FIG. 3 until it reaches terminal 242—84, thus finally positioning controlled element 252.

The continuously rotatable switches of the type herein described, wherein a number having two significant figures may be represented by and stored as an angular shaft position, with numbers having even more significant figures representable by a series of such disks interconnected by reduction gears having known tooth ratios, are well known in the art and will not be herein further described.

Such switches are modified for use in the present invention, as above set forth, by utilizing resistors connected between their terminals together with auxiliary switching elements, either manually or automatically actuated by any suitable means, so that they can provide to the control means of the relays the essential controlling voltages, and in a reversible manner. However, other input converting means may be used with the polarized relays of the circuit of FIG. 3, such as the input converting means of FIGS. 1 and 2. Conversely, the continuously rotatable switches of FIG. 3 may be used to provide the appropriate controlling voltages with the gain producing devices of FIGS. 1 and 2.

In FIGS. 4 and 5 are shown modifications of the circuit of FIG. 3, particularly relating to the rotary switches thereof, which aid in reducing ambiguities and other possible sources of error which might otherwise occur therein because of the necessary spaces between individual terminals 232 and 242 of their respective series.

Thus, as shown in FIG. 4, the tens portion of the device of the invention may have its rotary contactor 240 in the form of a pair of contactors 240a and 240b spaced apart by a distance greater than the open distance between adjacent terminals 242 as shown so that at least one of said contactors 240a or 240b is always certain to be on a terminal 242. Preferably, a resistor 241 is provided between contactors 240a and 240b with the center top thereof being connected to relay coil 212, although an end may be used if desired. In operation, such an arrangement prevents an error due to a single contactor being positioned between two adjacent terminals but not touching either while the center tapped resistor 241 makes certain a rest position of such two contactors with both of them in contact with the same terminal 242.

As shown in FIG. 5, in order to avoid the ambiguity that might exist, due to machine errors, if a number were of the order of 1599–1601, to prevent, say, an erroneous reading of "1501" or "1699," three contactors may be used, a central contactor 230d, as before, with a side contactor 230l and 230r, one on each side of the central contact 230 and spaced a distance therefrom equal to one-quarter of the distance between the centers of terminals 232, a switch 231 being provided selectively to connect one or the other of contactors 230l or 230r to central contactor 230.

With such an arrangement, the position of switch 231 may be selected in accordance with the number set into the machine by contactors 260 and 270, so that, for example, with a number having unit digits from zero to four, contactor 230l may be connected to contactor 230, while with a number having unit digits from five to nine, the contactor 230r may be connected to contactor 230.

Thus, it will be seen that the invention provides a novel digital comparator for numbers having a plurality of significant figures by means of which, for instance, a number may be equated to a preset number, or the like, without the necessity of counting such number by the usual digital techniques. Various modifications of the invention within the spirit thereof and the scope of the appended claims but not herein specifically disclosed, will be apparent to those skilled in this art.

I claim:

1. A digital comparator for comparing numbers having a plurality of significant figures comprising a series of voltage comparing relay means each effective to compare corresponding significant figures of said number in terms of voltages applied thereto, said relay means each having two terminal control means, means establishing a known digital voltage representing a single significant figure of a number to be compared with another voltage connected to one terminal of said control means, means applying a digital voltage to be compared with said known digital voltage to the other terminal of said control means, with the values of digital voltages applied being of the same order of magnitude for each of said voltage comparing relay means and output producing means responsive to a balanced condition of said control means, and means interconnecting said output producing means of said series effective to shift control of said output from said series of relay means progressively and sequentially from said relay means for said highest significant figure to that of said lowest significant figure by providing a progressively less effective control along said series of voltage comparing relay means rendering substantially inoperative in succession each said relay means from said highest significant figure to said lowest significant figure.

2. A control device including a digital comparator for comparing numbers having a plurality of significant figures comprising a series of voltage comparing relay means each effective to compare corresponding significant figures of said number in terms of voltages applied thereto, said relay means each having two terminal control means, means establishing a known digital voltage representing a single significant figure of a number to be compared with another voltage connected to one terminal of said control means, means applying a digital voltage to be compared with said known digital voltage to the other terminal of said control means, with the values of digital voltages applied being of the same order of magnitude for each of said voltage comparing relay means and output producing means responsive to a condition of said control means providing at least two discrete output conditions, means interconnecting said output producing means of said series effective to shift control of said output from said series of relay means progressively and sequentially from said relay means for said highest significant figure to that of said lowest significant figure by providing a progressively less effective control along said series of voltage comparing relay means rendering substantially inoperative in succession each said relay means from said highest significant figure to said lowest significant figure, and means responsive to said output conditions effective to vary said digital voltages to be compared with said known digital voltages applied to said control means.

3. A digital control device as claimed in claim 2 further including converting means effective to convert a digital pulse input representing a number having at least two significant figures into a digital series of voltages with a voltage representing each of said significant figures, and to apply said voltages to said control means, each successively higher figure of said digital series being applied to one of said control means of said series of relay means.

4. A control device as claimed in claim 2 wherein said relay means includes a pair of gain producing means each having a control element, an output current carrying element, and said interconnection means is in series relation with each of said pairs.

5. A control device including a digital comparator for comparing numbers having a plurality of significant figures comprising a series of voltage comparing gain producing means each effective to compare corresponding significant figures of said number in terms of voltages applied thereto, said gain producing means each having a pair of control elements each connected to a source of voltage representing corresponding significant figures to be compared means establishing a known digital voltage representing a single significant figure of a number to be compared with another voltage connected to one of said pair of control elements, means applying a digital voltage to be compared with said known digital voltage to the other of said pair of control elements with the values of digital voltages applied being of the same order of magnitude for each of said gain producing means and a pair of output current carrying elements providing output currents each responsive to voltage conditions of its associated said control element, resistance means interconnecting successive output current carrying elements of said series, said resistance means interconnecting one of said pairs of said current carrying elements with successive ones thereof and being in series relation with one another to provide a pair of series of resistance means having successively higher values of resistance along each of said series from said gain producing means for said highest significant figure effective to shift control of said output progressively and sequentially from said gain producing means for said highest significant figure to that of said lowest significant figure by providing a progressively less effective control along said series of gain producing means, and means responsive to difference in output current flow in said two series of resistance means.

6. A control device including a digital comparator for comparing numbers having a plurality of significant figures comprising a series of voltage comparing gain producing means each effective to compare corresponding significant figures of said number in terms of voltages applied thereto, said gain producing means each having a pair of control elements each connected to a source of voltage representing corresponding significant figures to be compared and a pair of output current carrying elements providing output currents each responsive to voltage conditions of its associated said control element, resistance means interconnecting successive output current carrying elements of said series, said resistance means interconnecting one of said pairs of said current carrying elements with successive ones thereof and being in series relation with one another to provide a pair of series of resistance means having successively higher values of resistance along each of said series from said gain producing means for said highest significant figure effective to shift control of said output progressively and sequentially from said gain producing means for said highest significant figure to that of said lowest significant figure by providing a progressively less effective control along said series of gain producing means, means applying preset voltages to one series of said pairs of control elements, converting means effective to convert a pulse input into a series of voltages proportional thereto and to apply said voltages in sequence to successive control elements of the other series of said pairs of control elements, each successively higher series being applied to the gain producing means having a successively higher value of resistance in series therewith, and means responsive to difference in output current flow in said two series of resistance means.

7. A control device as claimed in claim 6 further including means for presetting the voltages applied to said one of the two series of said gain producing means to a preselected value proportional to a preselected number of pulses.

8. A control device including a digital comparator for comparing digital quantities having at least two significant figures, voltage comparing means comprising at least two pairs of gain producing means, each said pair having a pair of control elements, and a pair of current carrying elements each with a resistance element in series therewith and a common current carrying element with a resistance element in series with said common current carrying element, with said resistance elements associated with each of said pair of current carrying elements of one of the two gain producing means of each of said pairs being in series relation with one another and said resistance elements of the other of the two gain producing means of each of said pairs being in series relation with one another to provide successively higher values of resistance in series with said current carrying elements of said series, converting means effective to convert a digital pulse input having at least two significant figures into a digital series of voltages with a voltage representing each of said significant figures, and to apply said voltages to successive control elements of one of the two series of gain producing means, each successively higher figure of said digital series being applied to one of said one series of said gain producing means having a successively higher value of resistance in series therewith, means for applying predetermined voltages to the other of said two series of said gain producing means for comparison with said voltages applied by said converting means, and means responsive to difference in current flow in said two series of resistance elements.

9. A digital control device as claimed in claim 8 wherein said converting means includes at least two digital series of cold cathode discharge means in series connection with one another, each of said digital series being effective to apply to said control elements a voltage proportional to the digital count in said digital series.

10. A digital control device as claimed in claim 8 wherein said means responsive to difference in current flow in said two series of resistance elements acts to control one of said series of voltages applied to said voltage comparing means.

11. A digital control device as claimed in claim 10 wherein said means responsive to difference in current flow acts to control the digital pulse input to said converting means to provide a predetermined quantity thereof in accordance with a predetermined voltage corresponding to said predetermined quantity applied to said other of said two series of said gain producing means.

12. A digital control device as claimed in claim 10 wherein said means responsive to difference in current flow controls said means for applying predetermined voltages to establish a series of voltages having a predetermined relationship with the voltages applied to said one series of gain producing means.

13. A digital control device as claimed in claim 12 wherein said means responsive to difference in current flow further acts to display symbols representative of said predetermined voltages.

References Cited in the file of this patent

UNITED STATES PATENTS

| | | |
|---|---|---|
| 2,625,822 | Nichols | Jan. 20, 1953 |
| 2,676,253 | Ayres | Apr. 20, 1954 |
| 2,736,878 | Boyle | Feb. 28, 1956 |
| 2,775,754 | Sink | Dec. 25, 1956 |
| 2,792,545 | Kamm | May 14, 1957 |
| 2,811,665 | McNaney | Oct. 29, 1957 |
| 2,839,744 | Slocomb | June 17, 1958 |
| 2,840,771 | Kamm | June 24, 1958 |
| 2,870,430 | Hancock | Jan. 20, 1959 |
| 2,872,670 | Dickinson | Feb. 3, 1959 |
| 2,896,198 | Bennett | July 21, 1959 |

OTHER REFERENCES

Nettell: "Digital Methods in Control Systems," Electronic Engineering, vol. 28, No. 337, pages 108–114, March 1956.